INVENTORS.
WRIGHT E. ERION
WILLIAM E. MOTT
BY
ATTORNEY

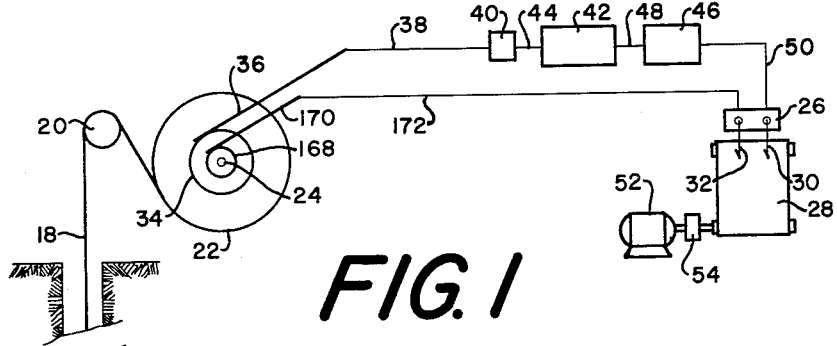
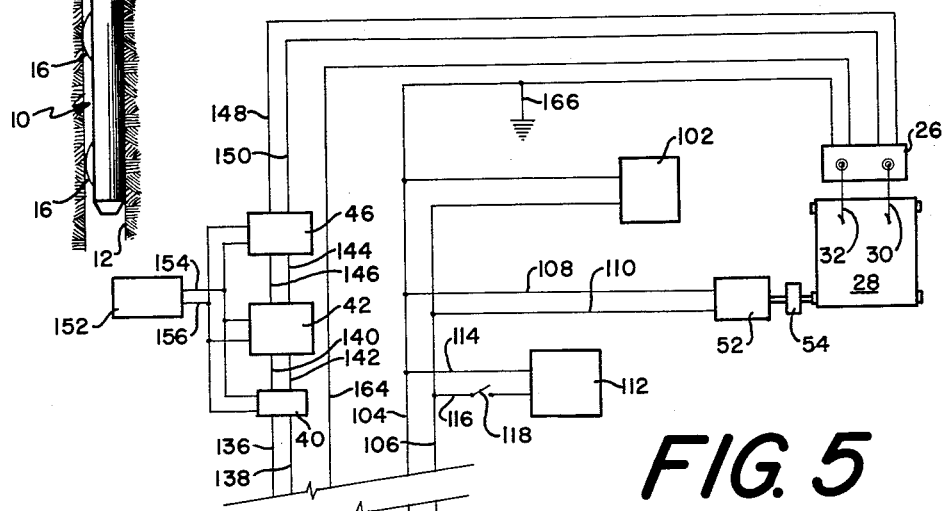
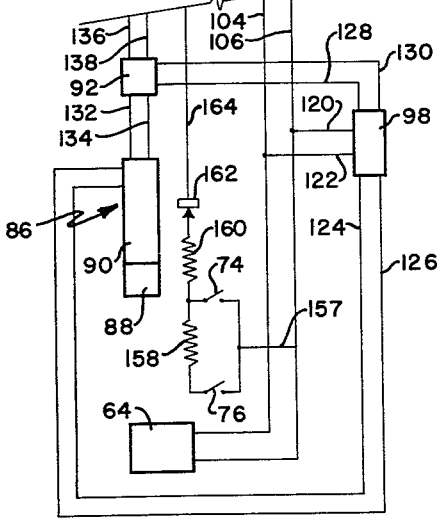
Dec. 5, 1961 — W. E. ERION ET AL — 3,012,145
RADIOACTIVITY BOREHOLE LOGGING
Filed Dec. 24, 1958 — 2 Sheets-Sheet 1
FIG. 1
FIG. 5
INVENTORS.
WRIGHT E. ERION
WILLIAM E. MOTT
BY
ATTORNEY Dec. 5, 1961 W. E. ERION ET AL 3,012,145
RADIOACTIVITY BOREHOLE LOGGING
Filed Dec. 24, 1958 2 Sheets-Sheet 2

United States Patent Office 3,012,145
Patented Dec. 5, 1961

3,012,145
RADIOACTIVITY BOREHOLE LOGGING
Wright E. Erion, McCandless Township, Allegheny County, and William E. Mott, O'Hara Township, Allegheny County, Pa., assignors to Gulf Research & Development Company, Pittsburgh, Pa., a corporation of Delaware
Filed Dec. 24, 1958, Ser. No. 782,918
4 Claims. (Cl. 250—83.3)

This invention relates to geophysical prospecting using nuclear radiations, and more particularly pertains to new and useful improvements in a method of and apparatus for well logging wherein the vertical distance between a source of radiations and a detector of radiations is varied. The invention is concerned with improvements in the method and apparatus disclosed in U.S. Patent No. 2,508,772 issued May 23, 1950 to Pontecorvo; U.S. Patent No. 2,543,675 issued February 27, 1951 to Swift; and U.S. Patent No. 2,692,949 issued October 26, 1954 to MacKnight.

Broadly, the invention involves the method of and apparatus for moving a logging probe vertically along a borehole penetrating earth formations, said logging probe including a radiation source component and a radiation detector component with one of such components being stationary relative to the logging probe, and vertically reciprocating the other component of the logging probe in such a manner that the instantaneous velocity of said other component in one direction relative to the logging probe is substantially equal in magnitude to and opposite in direction to the instantaneous velocity of the logging probe along the borehole.

In a narrower aspect, the invention involves the method of and apparatus for moving a probe housing along a borehole penetrating earth formations at a substantially constant velocity, and holding either a source of or a detector of radiations stationary within and relative to the housing while reciprocating the other of such elements vertically within and relative to the housing in a cyclic manner such that it is stationary with respect to the earth formations for a portion of each cycle.

The radiation source selected can be neutrons and/or gamma rays of any desired energy level or levels. The radiation detector selected can be such as to be primarily responsive to either gamma rays or neutrons or both, and the detector can be such as to respond preferentially to neutron radiation of a particular energy level or range of energies. Furthermore, the radiation detector can be associated with a discriminator or pulse height analyzer so that only detected radiation of a selected energy range is recorded. Also, the radiation detector can be responsive primarily to radiation of a different energy or of a different type than that primarily produced by the radiation source.

The invention is not primarily concerned with the types and combinations of radiation sources and radiation detectors selected, but rather is primarily concerned for whatever selection is made with the manner in which the radiation detector response changes with variations in the vertical spacing of the radiation source and radiation detector. The invention is concerned with achieving in effect a constant logging speed while producing a record of the response of the radiation detector that can be readily interpreted for each of a plurality of spaced positions along the borehole as a continuous record of the manner in which the response varies with source-detector spacing. While the invention is not primarily concerned with the nature of the radiation source and the nature of the radiation detector selected, it is preferred that the radiation source be a neutron source such as disclosed in the previously mentioned Pontecorvo patent, and that the radiation detector be either a gamma-ray detector or an epithermal neutron detector. Such preference is for the reason that either of such combinations yields particularly valuable information on varying the source-detector spacing as to the hydrogen content in the earth formations as well as to the manner that hydrogen content varies in the earth formations radially from the borehole (as where borehole liquids invade gas-filled porosity).

These and other important aspects of the invention will be clear in the light of the following description of preferred embodiments of the invention illustrated in the accompanying drawings, wherein:

FIGURE 1 is a simplified schematic illustration of the relation of the logging probe to the surface equipment;

Figure 2:
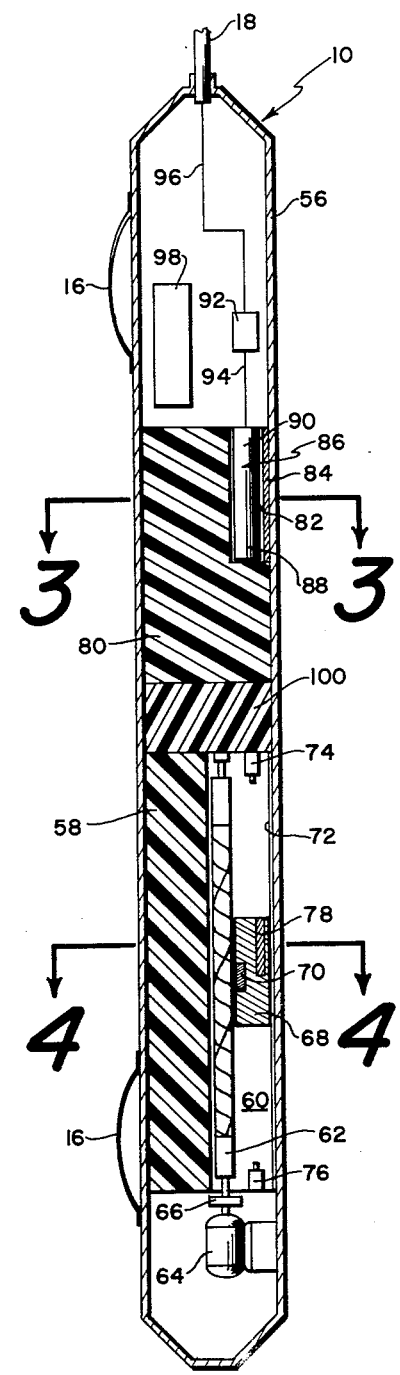
FIGURE 2 is a diagrammatic illustration of a logging probe according to the invention.
Figure 3:
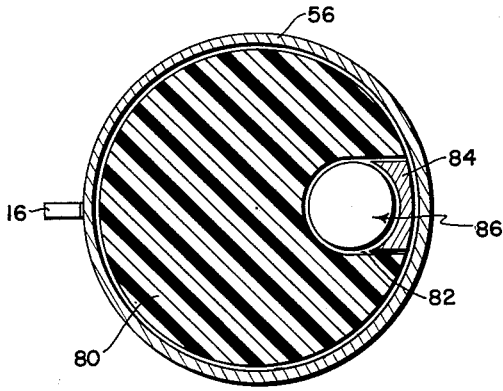
Figure 4:
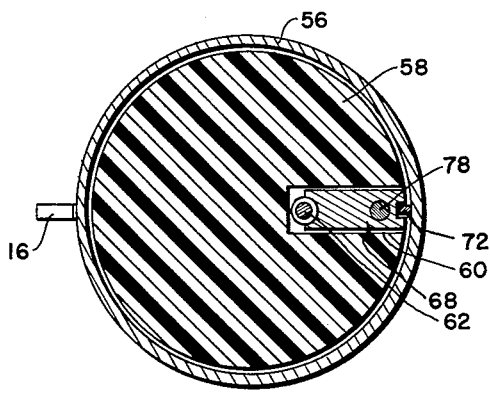

FIGURES 3 and 4 are enlarged transverse sectional views taken upon the planes of the section lines 3—3 and 4—4, respectively, in FIGURE 2; and FIGURE 5 is a diagram of the electrical system.

Referring initially to FIGURE 1, the numeral 10 designates generally a logging probe disposed for vertical movement in a borehole 12 penetrating earth formations 14. The borehole 12 can be cased or uncased, and the logging probe 10 is maintained against one side of the borehole 12 to position one side of the logging probe 10 in close proximity to the earth formations 14 by arcuate spring strips 16 carried by the logging probe 10.

The logging probe 10 is suspended for vertical movement within the borehole 12 by a conventional cable or line 18 of the type that includes a plurality of insulated electrical conductors, not shown, through which electrical energy can be supplied to and electrical signals received from the logging probe 10. The cable 18 is entrained over a pulley 20 and wound upon a reel 22. The reel 22 is of the power driven type such that the cable 18 can be let out or taken in at a substantially constant rate whereby the logging probe 10 can be raised or lowered at a substantially constant rate. The reel 22 includes an axle 24, and means for driving and braking the axle 24 will be presently described in connection with FIGURE 5.

A multiple recorder 26 is provided for recording detector response and for recording source-detector spacing signals upon a moving chart 28 by recording pens 30 and 32, respectively. Detector pulse signals are taken from the cable 18 on the reel 22 by slip rings 34 and brushes 36 and fed by conductor means 38 to amplifier 40, thence to a discriminator or pulse height analyzer 42 by conductor means 44. Amplified detector pulse signals passed by the pulse height analyzer 42 are fed to a counting rate meter 46 by conductor means 48, such counting rate meter 46 preferably being a conventional type known as a log counting rate meter that produces a direct current output signal proportional to the logarithm of the rate at which pulses are fed thereto. If desired, the pulse height analyzer can be dispensed with and the output of the amplifier 40 fed directly to the log counting rate meter 46. The output signal of the log counting rate member 46 is fed to the recorder 26 by conductor means 50. It will be understood by those skilled in the art that the pulse height analyzer can be of the multi-channel type, and that additional meters 46 together with additional recorder pen units can be employed in the recorder 26, whereby the output of each of the channels of the pulse height analyzer 42 can be separately recorded on the chart 28.

The chart 28 of the multiple recorder 26 is driven by a constant speed synchronous electric motor 52 through a reduction gear box 54. Considering the logging probe 10 being moved at a constant vertical velocity through the operation of the reel 22, and the chart 28 being driven at a constant velocity, it will be evident that the travel of the chart 28 is directly correlatable with the vertical position or depth of the logging probe 10 in the borehole 12. If desired, though not shown, the chart 28 can be marked or indexed as to logging probe 10 depth in the borehole 12.

Attention is now directed to FIGURES 2, 3, and 4 illustrating a form of the logging probe 10 particularly well suited for obtaining a neutron-gamma log. The logging probe 10 includes a probe housing 56. The probe housing 56 is fluid tight and is of sufficient structural strength to withstand the hydrostatic pressures to which the same is exposed during use. The probe housing 56 is formed of a material essentially transparent to the radiations to be emitted therefrom and also essentially transparent to the radiations to be detected therein. Such requirements can be reasonably met by making the probe housing 56 of steel.

Disposed within the probe housing 56 is a massive block of shielding material 58 having a vertical channel 60 therein. A reversing screw 62 is vertically mounted in the channel 60 for rotation, such screw 62 being of the same general type as used in the level wind mechanism of fishing reels, preferably however, differing in that the pitch of the opposite threads is different. In other words, the preferred thread arrangement is such that, for a given rotational velocity of the reversing screw, the object driven thereby will travel at a constant velocity in one direction, but at a differing and not necessarily constant velocity in the other direction. The reversing screw or shaft 62 is driven by a constant speed synchronous electric motor 64 through a reduction gear box 66.

Disposed for vertical reciprocation within the channel 60 is a carrier block 68. The carrier block 68 includes a follower 70 in operative engagement with the threads of the reversing screw 62, and is guided in its vertical movement by partially embracing the reversing screw 62, as best shown in FIGURE 4, and by having a vertical keyway therein that slidingly receives a vertical key 72 fixed to the probe housing 56. The arrangement is such that, during energization of the motor 64, the carrier block 68 reciprocates vertically in the channel 60 traveling at a constant velocity in one direction (downwardly when the logging is to be accomplished by moving the logging probe 10 upwardly in the borehole 12), and traveling preferably at a substantially higher, though not necessarily constant, velocity in the opposite direction. Disposed at the opposite ends of the travel path of the carrier block 68 so as to be actuated thereby as it reaches its limiting positions is a pair of normally open micro switches 74 and 76. The function of the micro switches 74 and 76 will be explained presently in connection with FIGURE 5.

Recessed in the carrier block 68 is a source of radiations 78, which can be a neutron source. Inasmuch as the logging probe 10 is to be herein described as for the purpose of obtaining a fast neutron-epithermal neutron log by way of example, the source of radiations is preferably a fast neutron source relatively free of gamma rays, such as a polonium-beryllium neutron source.

Spaced above the massive block of shielding material 58 is another massive block of shielding material 80 provided with a recess 82 extending along the side thereof opposite the spring strips 16 and above the channel 60. The recess 82 along with an insert 84 disposed in the recess 82 defines a cylindrical pocket in which a radiation detector designated generally at 86 is disposed. As the illustrated logging probe 10 embodiment is adapted for the particular purpose of obtaining a fast neutron-epithermal neutron log, the radiation detector should be primarily responsive to impinging epithermal neutrons and can take the form of the epithermal neutron detector disclosed in U.S. Patent No. 2,769,915 entitled "Epithermal Neutron Detector" issued to Charles W. Tittle November 6, 1956. In most instances, it is preferred that the radiation detector 86, whether for detecting gamma rays and/or neutrons, be of the scintillation type including a scintillating crystal 88 and a photomultiplier tube 90 for reasons of spatial efficiency and because discrimination as to the heights of the pulses produced by the photomultiplier tube can be effected if desired, such discrimination affording in some instances (especially with respect to gamma rays) a selectivity relative to the energies of the detected radiations. The output of the photomultiplier tube 90 is fed to an amplifier 92 by conductor means 94, and the output of the amplifier 92 is fed by conductor means 96 into the cable 18 for transmission to the surface equipment. A power supply 98 is provided in the probe housing 54 for the photomultiplier tube 90 and the amplifier 92 as will be described more fully in connection with FIGURE 5.

Another massive block of shielding 100 is provided intermediate the blocks of shielding 58 and 80. Inasmuch as the logging probe 10 is described as for the particular purpose of obtaining a fast neutron-epithermal neutron log, the blocks of shielding material 58, 80, and 100 can all be of such character as to absorb neutrons in such a manner as to produce few if any gamma rays in which instance they can have a high density of hydrogen and boron nuclei as when made of a mixture of divided solid methyl methacrylate resins and boric acid that has been compacted under heat and pressure to coherent and integral forms. It is considered within the province of those skilled in the art that the blocks of shielding 58, 80, and 100 can also include gamma-ray shielding matter (lead or bismuth), if desired, in admixture with the resins and the boron compound or as separate layers. The insert 84 and the carrier block 68 can be aluminum so as to be essentially transparent to neutrons and gamma rays, or of a suitable radiation shielding character, if desired, for particular applications such as in the present instance (fast neutron-epithermal neutron log) when either one or both of such elements can be at least in part composed of lead or bismuth alloys relatively transparent to neutrons as compared to gamma rays.

Attention is now directed to the diagrammatic electro-mechanical system shown in FIGURE 5. An alternating current power supply is designated by the numeral 102 adapted to provide alternating current at a constant frequency. The power supply 102 can include a synchronous motor or any type of constant speed prime mover coupled by variable ratio gearing to an alternating current generator so that the alternating current provided by the power source or supply 102 can be supplied at a selected constant frequency. The output of the power supply 102 is fed by leads 104 and 106 to the motor 64 and by parallel leads 108 and 110 to the motor 52. A reel drive mechanism 112 is connected to the axle 24 of the reel 22 for holding or breaking the axle 24 or for rotating the axle 24 in either direction at a constant velocity, and such drive mechanism 112 can include a constant speed synchronous motor, not shown, connected to the leads 104 and 106 of the power supply 102 by leads 114 and 116, whereby the speed of the drive of the reel axle 24 can be conveniently correlated to the speed of the motors 52 and 64, particularly on raising the logging probe 10, for whatever frequency of alternating current that is provided by the power supply 102. The lead 116 is provided with an on-off switch 118 that is normally closed.

The power supply 98 is energized by connection to the leads 104 and 106 by leads 120 and 122, with one output of the power supply 98 being connected to the photomultiplier tube 90 by leads 124 and 126 and the other output thereof being connected to the amplifier 92 by leads 128 and 130.

The output of the photomultiplier tube 90 is fed by leads 132 and 134 to the amplifier 92, and the output of the amplifier 92 is fed to the amplifier 40 by leads 136 and 138 that are preferably shielded to avoid any pickup of the signal from the leads 104 and 106.

The output of the amplifier 40 is fed to the pulse height analyzer 42 by leads 140 and 142, with the output of the analyzer 42 being fed to the log counting rate meter 46 by leads 144 and 146. The output of the log counting rate meter 46 is in turn fed to the recorder 26 for actuation of the pen 30 by leads 148 and 150. A power supply 152 is provided for parallel connection to the amplifier 40, the pulse height analyzer 42, and the log counting rate meter 46 by way of output leads 154 and 156.

One terminal of each of the micro switches 74 and 76 is connected to the power supply lead 106 by a lead 157, with the other terminals of such switches 74 and 76 being connected through a resistor 158, as shown. The terminal of the switch 74 connected to the resistor 158 is connected in series through a resistor 160 and a rectifier 162 to a lead 164. The lead 164 and the power lead 104 (grounded as indicated at 166) are connected to the recorder 26 for actuation of the pen 32. The surface connection for the lead 164 from the cable 18 to the recorder 26 is schematically illustrated in FIGURE 1 by a slip ring 168, a brush 170, and conductor means 172.

In operation, it is preferred that the logging operation be conducted with the logging probe 10 moving upwardly, such direction being preferred as maintenance of a constant velocity for the logging probe 10 is thereby more easily assured. The carrier block 68 and the neutron source 78 are reciprocated by the action of the motor 64 driving the screw 62 so that during their downward travel they move with a constant velocity relative to the probe housing 56 that is equal in magnitude to the constant upward velocity of the probe housing 56 through the borehole 12 relative to the surrounding earth formations 14. Accordingly, for a portion of each reciprocating cycle of the carrier block 68 and the neutron source 78 such elements 68 and 78 are stationary relative to the earth formations 14. Also, when the upward velocity of the carrier block 68 and the neutron source 78 is greater than the downward velocity of such elements (as by virtue of the differing thread pitches on the screw 62), it will be appreciated that a major portion of the time of each cycle of reciprocation is consumed with the carrier block 68 and the neutron source 78 being stationary relative to the earth formations 14, and that the spacing between the radiation detector 86 and the radiation source 78 increases at a constant rate during such portion of the reciprocating cycle.

The initiation and termination of each of such portions of the reciprocating cycle when the carrier block 68 is stationary with respect to the earth formations 14 are distinguishably recorded on the chart 28 by the recording pen 32. This will be apparent on noting that a circuit is completed to the recorder 26 from the power leads 104 and 106 on closure of the switch 74 by the carrier block 68 at the upper end of its travel, such circuit including lead 106, lead 157, switch 74, resistor 160, rectifier 162, and lead 164. An analogous circuit is completed on closure of the switch 76 by the carrier block 68 at the lowest end of its travel, such analogous circuit including lead 106, lead 157, switch 76, resistors 158 and 160, rectifier 162, and lead 164. The actuation of the pen 32 caused by closure of the last-described circuit is less than that caused by closure of the first-described circuit because of the additional resistor 158 in series with the switch 76. The record made by the pen 32 on the moving chart 28 can thereby be interpreted as to which of the switches 74 and 76 is closed and also as to the depth of the logging probe 10 in the borehole 12 at the instant of switch operation. This latter consideration is due to the correlation previously mentioned between the rate at which the chart 28 travels and the rate at which the cable 18 is taken up by the reel 22, and the related correlation between the depth of the logging probe 10 and the portion of the chart 28 traveling past the recording pens 30 and 32.

The synchronization of the reciprocation of the carrier block 68, the vertical velocity of the logging probe 10, and the rate of movement of the chart 28 are conveniently achieved by each of such operations being driven by synchronous motors, as described, all of which are energized by a common source of alternating current 102. Such arrangement makes it possible to select different logging speeds by making an appropriate change in the frequency of the power supplied by the source 102. It is of course appreciated that the synchronization described can be achieved by means other than such as illustrated which are well known to those skilled in the art, and we therefore do not intend to be limited to the particular means illustrated. Exemplary of commonplace expedients for achieving synchronization of motion of remote rotating members is the "Selsyn" electrical transmission system. A "Selsyn" electrical transmission system can, for example, be connected between the pulley 20 (effectively a measuring wheel) and the reversing screw 62 (appropriate gearing being employed to realize the described periodic stationary relation of the carrier block 68 to the earth formations 14) and between the pulley 20 and the chart 28. Such employment of a "Selsyn" electrical transmission system would have the disadvantage of requiring more conductors in the cable for driving the reversing screw 62, which disadvantage could perhaps be considered as more than offset by enabling the logging speed to be varied at will during any single logging run, whereby large statistical fluctuations in detector response can be reduced by reducing logging speed as may be deemed necessary.

The illustrated system for affording the desired synchronization has the advantage of enabling the logging probe 10 to be placed at any position in the borehole 12 believed to be of particular interest and the reel driving means 112 rendered inoperative, as by the opening of the switch 118, to secure the logging probe 10 at such position after which the motors 52 and 64 are operated in the usual manner, whereby a record can be obtained of detector response versus source-detector spacing, it being understood that the operation of the pen 32 greatly facilitates such correlation.

It will be apparent from the foregoing that logging while moving the logging probe 10 upwardly as specified previously will result in a logging record on the chart 28 such that intermediate successive pips by the pen 32 as a result of sequential closure of the switches 74 and 76 will, in effect, be interpretable as a record of detector response versus source-detector spacing for a particular borehole depth. This is because the carrier block 68 and the source 78 are stationary during such interval relative to the earth formations 14, with the source-detector spacing progressively increasing at a constant rate during such interval. During the intervening intervals, which are shorter because of the different pitch of the opposite threads on the reversing screw 62, the record is not related as sharply to a particular borehole depth, but does reveal generally the manner in which detector response varies with source-detector spacing over the range of borehole depths between successive positions at which vertical motion of the carrier block 68 ceases with respect to the earth formations.

It will be plain that it is within the purview of the invention that it is not essential that the radiation detector 86 be fixed in position with respect to the probe housing 56 with the radiation source 78 being fixed in position to move with the carrier block 68, and that the illustrated positions of the detector 86 and the source 78 can be reversed, that is, such elements can be respectively fixed in position to the carrier block 68 and the probe housing 56. It is considered that such change in relation can be accomplished by those skilled in the art by appropriately modifying the size of other parts, notably the carrier block 68, so that the latter can accommodate the detector 86. The illustrated arrangement is preferred to the alternative for the reason that the size of the source 78 is suitable for use with a smaller carrier block 68 and because the electrical connections for the detector 86 need not be subjected to flexing.

With the particular source 78, detector 86, and shielding components (58, 80, and 100) disclosed by way of example in the logging probe 10 as being suitable for obtaining a fast neutron-epithermal neutron log, the operation will be readily understood. The earth formations 14 on the side of the probe housing 56 opposite the spring strips 16 are subjected to fast neutrons from the source 78, it being noted that the shielding materials and the position of the channel 60 facilitate such direction of source neutrons. Epithermal neutrons detected by the detector 86 enter the probe housing 56 primarily from the earth formations 14 opposite the spring strips 16 and reach the detector through the insert 84.

The importance of the response of the detector 86, using the described embodiment of the logging probe 10 for obtaining a fast neutron-epithermal neutron log, as a function of source-detector spacing is well known, the same being of interpretive value as to the hydrogen concentration in the earth formations 14. The provision of the log counting rate meter 46 is of special importance in the case of this example in that the logarithm of the counting rate of the detector 86 is roughly linear with respect to source-detector spacing, with the slope of a plot of the logarithm of counting rate versus spacing being roughly correlatable with the concentration of hydrogen. Results of roughly the same interpretive value can be obtained using a gamma-ray detector in combination with a fast neutron source.

It is contemplated that any type of radiation source desired can be used in combination with any type of radiation detector desired. The choice of materials to be used for the shielding blocks 58, 80, and 100 can be made on the basis of the types of source and detector selected (it being noted that such shielding blocks can be of differing shielding characteristics and can differ from each other), such choice being well within the scope of those familiar with the art.

Not only can the detector and the source be reversed as to which one is to be the reciprocating element, but it is apparent that neither one nor both of such elements need be eccentrically positioned relative to the probe housing 56 as shown in FIGURES 2, 3 and 4, as either one or both of such elements can be positioned axially of the probe housing 56 by making the recess 82 a central opening in the shielding block 80, and by making the channel 60 a central opening in the shielding block 58 (corresponding relocation of the carrier block 68, its drive, and the switches 74 and 76 being made). With centralization of the source and the detector, conventional centralizing means can be fixed to the exterior of the probe housing 56 in lieu of the spring strips 16.

It will be obvious to those active in the logging field that other means than direct electrical conduction can be employed for transmitting the signals illustrated as being carried by the leads 136, 138, and 164 between the logging probe 10 and the associated surface equipment. For example, a conventional frequency modulated carrier system requiring only a single conductor can be employed in lieu of the conductors 136, 138, and 164.

The range of variable source-detector spacings desired can differ somewhat depending on the nature of the source and the nature of the detector used, but as a general rule a range of about one foot to about 3 feet will be satisfactory for most purposes.

From the foregoing, it will be plain that the preferred illustrated and described embodiments of the invention are very susceptible to numerous modifications as to both the method practiced and the apparatus used without departing from the true scope of the invention. Accordingly, the actual scope of the invention should be ascertained by reference to the appended claims.

We claim:
1. Borehole logging apparatus comprising a probe housing, means for moving the probe housing along a borehole at a constant velocity, a radiation source component and a radiation detector component in the probe housing, one of said components being secured against vertical movement in the housing, with the other component being vertically movable in the probe housing, and means for vertically reciprocating said other component, with the reciprocable motion being at a constant velocity in one direction.

2. The combination of claim 1, wherein said reciprocating means comprises a vertical reversing screw rotatably mounted in the probe housnig, means operatively connecting the reversing screw to said other component, and a constant speed electric motor drivingly connected to the reversing screw.

3. The combination of claim 2, wherein the opposite threads of the reversing screw are of different pitch.

4. The combination of claim 2, including means for indicating each instance in which said other component reaches at least one of the limiting positions of its reciprocating motion.

References Cited in the file of this patent
UNITED STATES PATENTS

| | | |
|---|---|---|
| 2,371,628 | Krasnow | Mar. 20, 1945 |
| 2,508,772 | Pontecorvo | May 23, 1950 |
| 2,692,949 | MacKnight | Oct. 26, 1954 |
| 2,829,268 | Chope | Apr. 1, 1958 |
| 2,842,678 | Silverman | July 8, 1958 |
| 2,882,417 | Johnson | Apr. 14, 1959 |